H. E. Woodbury.

Bill & Paper File.

No. 2,930. Reissued May 12, 1868

UNITED STATES PATENT OFFICE.

HENRY E. WOODBURY, OF WASHINGTON, DISTRICT OF COLUMBIA.

IMPROVEMENT IN PAPER-FILES.

Specification forming part of Letters Patent No. 11,504, dated August 8, 1854; Reissue No. 2,930, dated May 12, 1868.

*To all whom it may concern:*

Be it known that I, HENRY E. WOODBURY, of the city and county of Washington, in the District of Columbia, have invented an Improved and Useful Document File or Holder, of which the following is a full, clear, and exact description, reference being had to the accompanying drawings, which form part of this specification, in which—

Figure 1:
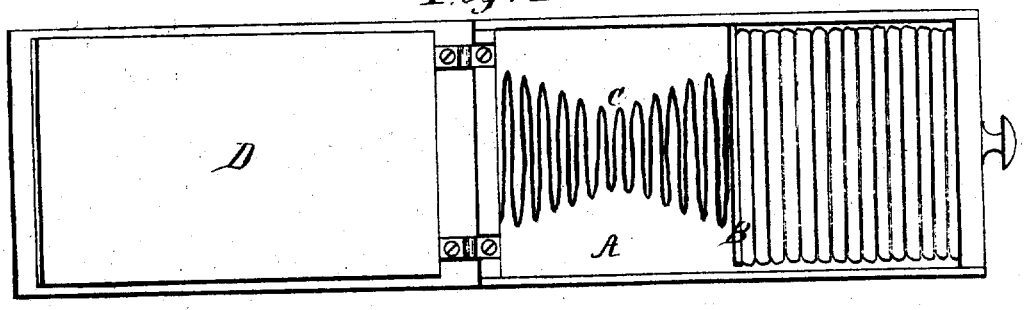
Figure 2:
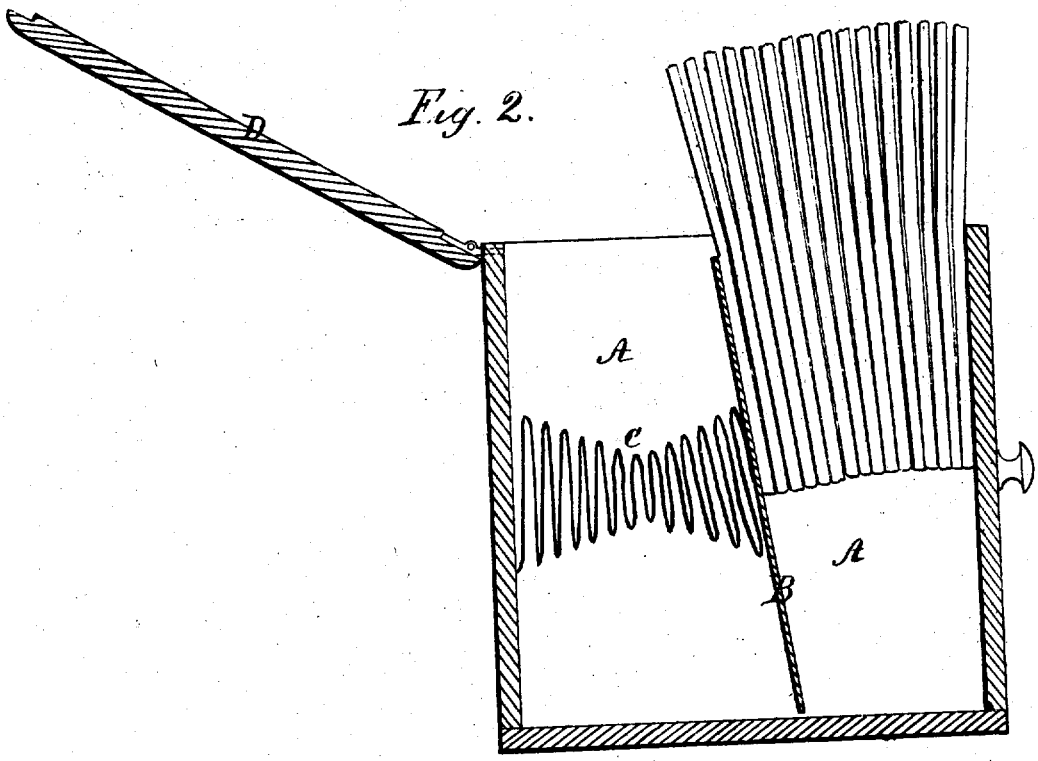

Figure 1 represents a top view or plan of my improved document-file open, with folded documents contained therein. Fig. 2 represents a vertical longitudinal section thereof, with the documents partly raised for the purpose of reading the endorsements on their backs.

In filing public and private documents it is usual to fold into regular forms and sizes, and indorse each one separately with an epitome of its contents, date of reception, or note having reference to the particular character of business to which it relates, tie, band, or put in wrapper the several documents relating to the same business accumulating from time to time. Where the business is of a varied character, of course many such files have to be kept; and in many instances—as, for example, in the various departments of the Government, where frequent reference to papers on file is requisite—much trouble and inconvenience arise, both in filing away new papers and in abstracting old ones for examination, in tying and untying the tape or band; and such frequent tying and untying not only exposes papers to loss, but by the abrasion of the tape or band on the edges of the folded documents rubs and wears them into holes, whereas their perfect preservation, in some instances for an indefinite period, is a matter of the utmost importance. To obviate such injury, inconvenience, and annoyance in the filing of folded documents is the object of this improvement, which consists of a box or compartment, A, the depth and width across of which correspond to the length and width of the folded document, and is of any convenient length, according to the number of papers designed to be held in one file. The sides of this box may either be made of flexible or elastic material, to enable them to yield to papers of different widths being filed therein, and to protect the edges of the papers from injurious abrasion; or they may be of hard and inflexible material. Within this box is a loose holder or platen, B, that is of nearly the same width and depth as the inside of the box, and is hung or attached to one or more springs, C, the other end or ends of which is or are secured against the back end of the box in any suitable manner, to force up the loose holder or platen B toward the front end of the box. A lid, D, covers the opening in the top of the box. The lid of the box being opened, the folded papers or documents are inserted between the front end of the box and the platen B by pushing back the platen, which by its elastic pressure holds the papers thus inserted firmly in their place, and so from time to time fresh documents may be added till the box is full, or separate papers be abstracted without much or any delay, and without displacing or removing others in the file; and by the manner in which the loose holder or platen is hung and acted upon, the greatest facility is afforded for examining the endorsements of the several papers, in search after one or more particular documents, as the yielding of the platen or its capability of being bent or leaned back admits of all or several of the papers being drawn partly out of the box A, and of being pushed back or separated at their top ends, to read their endorsements, without releasing the papers from the hold of the spring-platen.

Any number of these box or compartment files may be built together to form a cabinet, or may be arranged upon shelves in form of drawers, in which case the lid may be dispensed with; or each may be a portable and separate file, as represented in the drawings; and, in addition to the advantages already specified, they are simple and durable, preserve the contents perfectly free from dust, also from destruction by mice, and the additional expense of fitting up a room or office with them, instead of with pigeon-holes, would be but trifling, compared with the neatness of the apartment, the cleanliness and preservation of the documents, and its facility of reference thereto.

Having thus described my invention, what I claim as new, and desire to secure by Letters Patent, is—

The box or compartment document-file consisting of a box part, A, and spring platen or holder B, the said holder being hung or attached to a spring or springs, C, at its back, so as to give a flexible or yielding character to the platen, all constructed and operating substantially as herein described.

HENRY E. WOODBURY.

Witnesses:

PHILIP T. BERRY, Jr.,

SYDNEY E. SMITH.